United States Patent [19]

Rotter

[11] 3,952,326

[45] Apr. 20, 1976

[54] DROPOUT COMPENSATOR FOR A TRISEQUENTIAL COLOR VIDEO PLAYBACK SYSTEM

[75] Inventor: Gerhard Rotter, Mission Viejo, Calif.

[73] Assignee: BASF Aktiengesellschaft, Ludwigshafen (Rhine), Germany

[22] Filed: Sept. 19, 1974

[21] Appl. No.: 507,433

[52] U.S. Cl. .............................. 358/8; 178/6.6 DC; 360/38
[51] Int. Cl.² ............................................ H04N 5/76
[58] Field of Search ............. 358/8, 11, 14; 360/38; 178/6.6 DC

[56] References Cited
UNITED STATES PATENTS

| | | | |
|---|---|---|---|
| 3,560,635 | 2/1971 | Bruch | 358/9 |
| 3,586,762 | 6/1971 | Hodge et al. | 358/8 |

FOREIGN PATENTS OR APPLICATIONS

| | | | |
|---|---|---|---|
| 2,148,486 | 1/1973 | Germany | 358/8 |

Primary Examiner—Robert L. Richardson

[57] ABSTRACT

The invention relates to a dropout compensator for a trisequential color video playback system which compensates for dropouts in color video signals with a high degree of accuracy. Only the color information including the Y low portion of the luminance signal is delayed for a period of substantially one line of video information after separation of the color information from the Y high portion of the luminance signal and after FM demodulation of the color information signals. In addition to the two conventional delay means, connected in series, present in a trisequential system and necessary for converting time-sequential occuring color signals into signals occurring at the same time, there is provided a third delay means for the compensation of dropouts. The output signal of the third delay means is switched by a switch means to the entrance of the first two delay means, the switch means being controlled by a detector means detecting a signal level decrease in the envelope of the FM signal when a dropout occurs.

3 Claims, 6 Drawing Figures

DROPOUT COMPENSATOR FOR A TRISEQUENTIAL COLOR VIDEO PLAYBACK SYSTEM

BACKGROUND OF THE INVENTION

1. Field of the Invention

The present invention relates to a dropout compensator for a trisequential color video recording and playback system. In such a system the three color signals are recorded sequentially and played back within three consecutive lines whereas the Y high information is played back within each line. A signal having a dropout is automatically replaced by a signal scanned three lines before, which signal includes the same color information as the replaced signal.

2. Description of Prior Art

In video recording, how to compensate for defects in signals like dropouts has always been a problem. Such defects can originate from the recording medium itself, from the scanning means and/or from inaccurate head tracking. Dropout compensators are well known in the art and are used to provide information as a replacement for information which is missing from the video signal. In principle such a compensator works as follows.

When a modulated recorded video signal is played back, it is divided into two substantially identical components, one of the components being delayed with respect to the other component by an interval of time that is substantially equal to the time required for one horizontal scan period. Under normal conditions, when no defect occurs, the undelayed component is utilized and the delayed component is suppressed. When a defect in the signal such as a dropout is detected by a detector, a switch is operated which releases the delayed signal and cuts off the undelayed signal for the time the defect is in existence. Because a video signal during any given scan is largely redundant over the adjacent scan, the occasional and random repetition of a horizontal line of limited portions of such a line will generally go unnoticed by the viewer of a television screen for instance. This applies to both black and white video signals and color video signals if more than one color information is available during one line scan period.

In a trisequential color video system during each line scan period only one color information is produced, as will be clear from the following. When the first line includes the "red" information, the second line includes the "green" information and the third line contains the "blue" information. In the case of the foregoing method for dropout compensation, a "red" line signal including a defect would be replaced by a "blue" line signal, a "green" line signal by a "red" line signal and a "blue" line signal by a "green" line signal.

A dropout compensator disclosed in Germany Printed Application (DAS) No. 2,148,486 is applicable to a trisequential color video recording and playback system. Here, a compensating signal is used which is an aggregate signal derived from the color signals occurring during the last two line scan periods, calculated from the scan period within which a dropout occurs. When the dropout occurs within the "red" signal period, the said compensating signal consists of the aggregate "blue" and "green" signals.

It is clear to anyone skilled in the art that it is not possible to obtain good results with the above compensating method because dropouts which continue for a longish period, e.g. for as long as or longer than one line scan period, will be perceived by the viewer. This disadvantage is very serious, when at least one of the aggregate color signals has a high color intensity.

An object of the present invention is to overcome the disadvantages of conventional dropout compensators. A further object of the invention is to provide a highly effective method of compensating for dropouts in a trisequential color video recording and playback system. Yet another object of the invention is the provision of an inexpensive dropout compensator circuit.

An even further object of the invention is to achieve effective dropout compensation for color and luminance signal up to three line scan periods. The novel device according to this invention employs new and improved means for sensing the occurrence of a dropout, and new and improved means for switching from one signal to another signal during the existence of the abnormal condition without creating visually noticeable or objectionable alterations in the picture.

The device of the present invention is applicable to any trisequential color video system. Such a system may for example employ a magnetic tape, a magnetic disc, a piezoelectrical scannable disc or an optically scannable disc. In such recording and playback systems the use of color video signals brought into trisequential form is very advantageous because the usable bandwidth range of the recording medium is fully utilized. These and other features and advanatages of the present invention will become readily apparent from the following detailed description of one operative embodiment of the present invention, particularly when read in connection with the accompanying drawings.

DESCRIPTION OF THE PREFERRED EMBODIMENT

Figure 1:
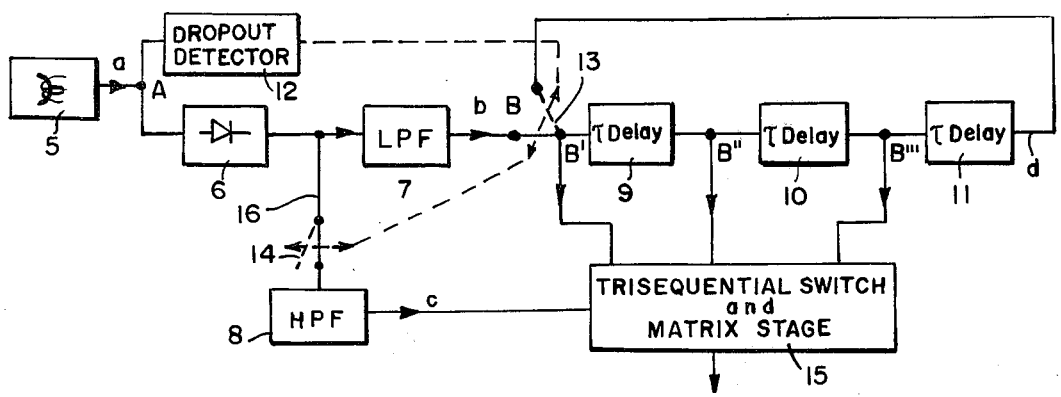
FIG. 1 is a block diagram of a signal output compensating device embodying one form of the present invention particularly adapted for use with a video tape recording and reproducing system.
Figure 3:
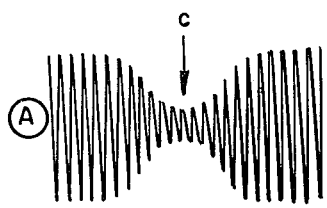
FIG. 3 shows a frequency modulated playback signal scanned from a tape which occurs at the point A in FIGS. 1 and 2.

The block diagram of the playback circuit shown in FIG. 1 includes stages 5 to 15, namely a playback head and preamplifier stage 5, a demodulator 6, a low-pass filter 7, a high-pass filter 8, a first delay means 9, a second delay means 10, a third delay means 11, a dropout detector 12, a first switch means 13, a second switch means 14 and a trisequential switch and matrix stage 15. The output signal a of stage 5 is a frequency modulated video signal, normally of constant amplitude, which is shown in FIG. 3 with a dropout C. The signal is played back from a recording medium (not shown) such as a magnetic video tape by means of magnetic transducer means, for example a magnetic head, with a preamplifier connected thereto. At the point A an FM demodulator 6 follows the exit of stage 5 for separation of the carrier frequency from the video signal. Point A is also connected to the entrance of the detector stage 12 which serves to detect dropouts.

The signal leaving the demodulator stage 6 is separated by a high-pass-filter 8 into a signal c and by a low-pass-filter 7 into a signal b. At the entrance to filter 8 a switch 14 is positioned by means of which the line 16 can be interrupted; the purpose of this switch will be explained below. The signal c leaving stage 8 is the Y high signal which is a portion of the luminance signal having a frequency range starting at approximately 500 kilocycles.

Figure 4:
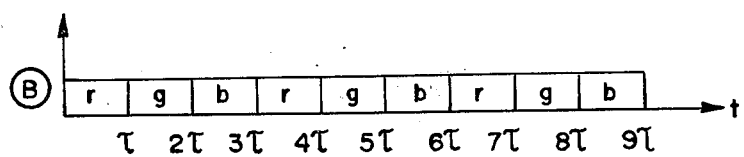
FIG. 4 shows the demodulated trisequential color video signal occurring at the point B in FIGS. 1 and 2.
Figure 5:
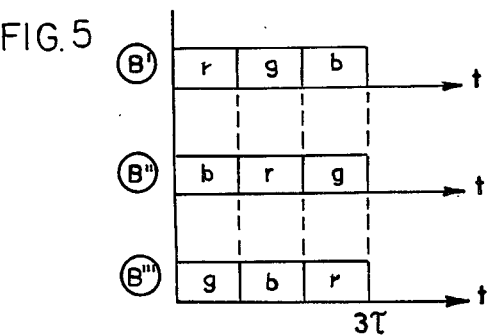
FIG. 5 shows the color video signals existing at the points B', B'' and B''' in FIG. 1.

To a point B at the exit of the low-pass filter 7 there is connected a first switch 13 which in the position shown feeds the demodulated signal occurring at point B to the first delay means 9, the time delay produced being as long as the horizontal line scan period, i.e. about 63 to 64 microseconds. The first and all following delay means are advantageously in the form of acoustic or electronic delay lines. The exit of the first delay means 9 is connected to the entrace of the second delay means 10 which produces a time delay equal to that of the first delay means 9, said first and second delay means 9 and 10 being used to convert three color signals occurring one after the other into three color signals occurring at the same time. The three different color signals indicated as $r$(red), $b$(blue) and $g$(green) occur simultaneously at points B′, B″ and B‴. The relationship as regards time and sequence between the scanned color video signals at point A and the delayed color video signals occurring at points B′ to B‴ is shown in FIGS. 4 and 5. At point A the reproduced signal consists of consecutively reproduced signal groups $r, g, b$ and the luminance signal above 500 kc (Y high position). At points B′ to B‴ the different color information $r, b$ and $g$ occur at the same time, which information comprises the Y low portion of the luminance signal. The complete video signal is composed by the stage 15 which includes a trisequential switch means and a matrix. The output signal of stage 15 is a complete luminance and color signal in unmodulated form.

Delay means 11 is responsible for accurate dropout compensation. Its output line $d$ is connected to the switch 13. When a dropout or another undesirable signal $c$ occurs within the red color information, said signal $c$ has already been detected by the detector 12 which controls switch 13 and switches it to the dotted-line position, with the result that the red information which was shown three line periods before and is now stored by delay means 11 is fed to point B′ as will be clear from FIG. 4. When dropout signals $c$ occur within the green or blue information, the missing information is replaced by the appropriate information stored in delay means 11.

Switch 13 is activated only during the occurrence of an abnormal signal; at the end of such a signal switch 13 is turned to its normal position (point B). The other switch 14 is activated simultaneously together with switch 13. Line 16 is thus interrupted and no Y high information (signal c) is fed to stage 15.

Switch 14 is provided because when there is a dropout, noise signals having high amplitudes occur at the output of demodulator 6 which are noticeable on the screen. It is clear to anyone skilled in the art from the foregoing that the interruption triggered by switch 14 is absolutely necessary in order to obtain a high-quality picture. Furthermore an additional advantage is offered by the use according to the invention of the delay means 11 since abnormal signals lasting for a period of three line periods or more can be compensated for without the need for any further means.

Figure 2:
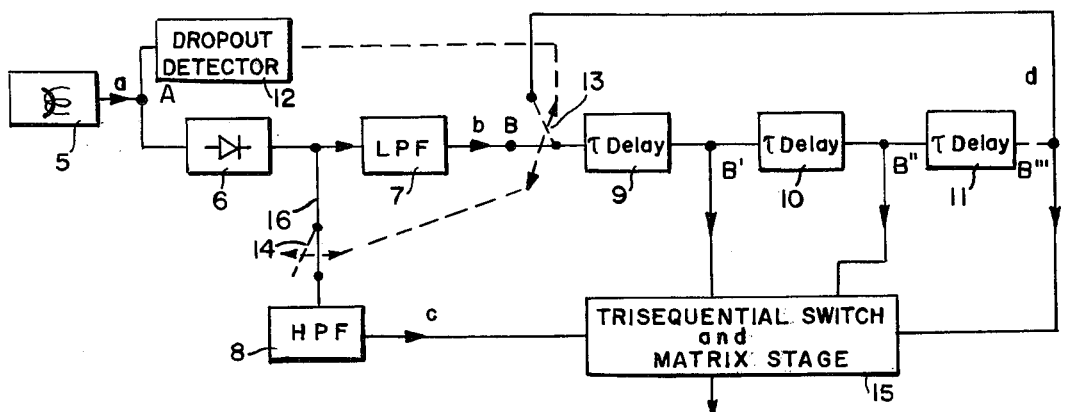
FIG. 2 is a block diagram of a signal dropout compensating device embodying another form of the present invention.
Figure 6:
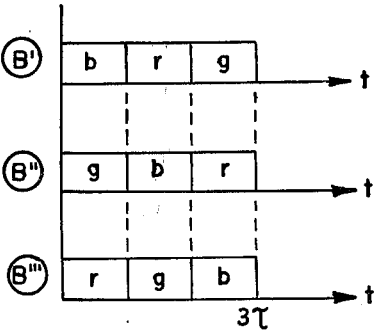
FIG. 6 shows a schematic diagram of the color video signals existing at the points B', B'' and B''' in FIG. 2.

FIG. 2 shows an obvious alternative embodiment of the invention. The system functions similarly to the system explained above except the three inputs to the trisequential switch and matrix stage B′, B″ and B‴ are after the delay means 9, 10 and 11 instead of before them. FIG. 6 compares the sequence of the video signals at points B′ to B‴.

For greater simplicity conventional conditions and circuits have not been described. For example, on account of the limited bandwidth (about 500 kc) of conventional delay lines an AM modulator should be provided which feeds AM-modulated signals to the delay means 9 to 11. In this case a demodulator should be included in the matrix stage 15. The delay means may also be in the form of bucket brigades or CCD's (Charged Coupled Devices) or PCCD's (Peristaltic Charged Coupled Devices).

The other circuits schematically disclosed in the block diagrams are known to those skilled in the art and it is therefore not necessary to describe these circuits in detail.

It is obvious that, although the present invention has been described with reference to an advantageous embodiment, various adaptions and modifications may be made. The invention is therefore only to be limited by the appended claims.

I claim:

1. In the playback channel of a trisequential color video playback system, including
    an FM demodulator for elimination of the FM carrier from the FM-modulated video signal recorded in trisequential form,
    a separator means for separation of the Y high portion from the video signal, and
    first and second delay means for recombination of the trisequential video signals into composite color video signals,
    a dropout compensating arrangement comprising:
    a detector means for detecting a dropout signal occurring in the envelope of the still FM-modulated video signal,
    a third delay means connected to the first and second delay means for the provision of a delayed color video signal, and
    a switch means selectively connecting the output lead of the third delay means to or disconnecting it from the entrance of the first delay means, said switch means being controlled by said detector means to connect the output lead of the third delay means to the entrance of the first delay means when a dropout is detected by the detector means.

2. In the playback channel of a trisequential color video playback system a dropout compensating arrangement as claimed in claim 1, wherein each of the first, second and third delay means includes a delay line having a time delay substantially corresponding to a horizontal line scan period.

3. In the playback channel of a trisequential color video playback system, including:
    an FM demodulator for elimination of the FM carrier from the FM-modulated video signal recorded in trisequential form, a separator means for separation of the Y high portion from the video signal to provide a Y high path, and first and second delay means for recombination of the trisequential video signals into composite color video signals, a dropout compensating arrangement comprising:

a detector means for detecting a dropout signal occurring in the envelope of the still FM-modulated video signal, a third delay means connected to the first and second delay means for the provision of a delayed color video signal, a switch means selectively connecting the output lead of the third delay means to or disconnecting it from the entrance of the first delay means, said switch means being controlled by said detector means to connect the output lead of the third delay means to the entrance of the first delay means when a dropout is detected by the detector means, and an additional switch means controlled by said detector means simultaneously with said first-mentioned switch means to disable said Y high path, thereby preventing the passing on of the Y high portion of the video signal during the occurrence of a dropout.

* * * * *